United States Patent [19]

Ray

[11] B 4,013,188

[45] Mar. 22, 1977

[54] INDUCTION SEALED CLOSURE

[75] Inventor: George C. Ray, Battle Creek, Mich.

[73] Assignee: General Foods Corporation, White Plains, N.Y.

[22] Filed: Mar. 1, 1973

[21] Appl. No.: 337,023

[44] Published under the second Trial Voluntary Protest Program on March 30, 1976 as document No. B 337,023.

[52] U.S. Cl. .............................. 215/347; 215/232; 215/341; 215/349; 428/484

[51] Int. Cl.² ................. B65D 53/04; B65D 53/06

[58] Field of Search ......... 215/1 C, 31, 40, DIG. 4, 215/341, 346, 347, 349, 232; 229/3.1, 43, 48 T; 161/213, 234; 220/53

[56] References Cited

UNITED STATES PATENTS

| | | | |
|---|---|---|---|
| 2,185,031 | 12/1939 | MacLaren | 215/DIG. 4 |
| 2,227,787 | 1/1941 | Laufer | 161/234 |
| 2,528,506 | 11/1950 | Faye | 215/40 X |
| 2,620,939 | 12/1952 | Weisgerber | 215/40 |
| 2,715,474 | 8/1955 | Phillips | 215/40 |
| 2,734,649 | 2/1956 | Callaham | 215/347 |
| 2,937,481 | 5/1960 | Palmer | 229/48 T X |
| 3,301,464 | 1/1967 | Amberg | 229/43 |
| 3,355,348 | 11/1967 | Lamar | 161/213 |
| 3,460,310 | 8/1969 | Adcock | 215/232 |
| 3,591,031 | 7/1971 | Komendowski | 215/1 C |
| 3,632,004 | 1/1972 | Grimes | 215/40 |
| 3,767,076 | 10/1973 | Kennedy | 215/40 |

Primary Examiner—William Price
Assistant Examiner—Ro E. Hart
Attorney, Agent, or Firm—C. Garman Hubbard; Thomas V. Sullivan; Bruno P. Struzzi

[57] ABSTRACT

A novel membrane-to-closure mouth structure is effected by causing a paraffin-based heat activatable peelable sealing ply on a thin metallic foil to adhere to a sealing face of a closure mouth composed of a polymer such as polyethylene by electromagnetically inducing intense abbreviated heat in the foil and consequent focusing of the heat activation necessary for resin migration under pressure to form a water and gas transmission barrier in a frangible sealing ply structure composed primarily of low tensile strength waxes complemented by tackifying materials.

9 Claims, 1 Drawing Figure

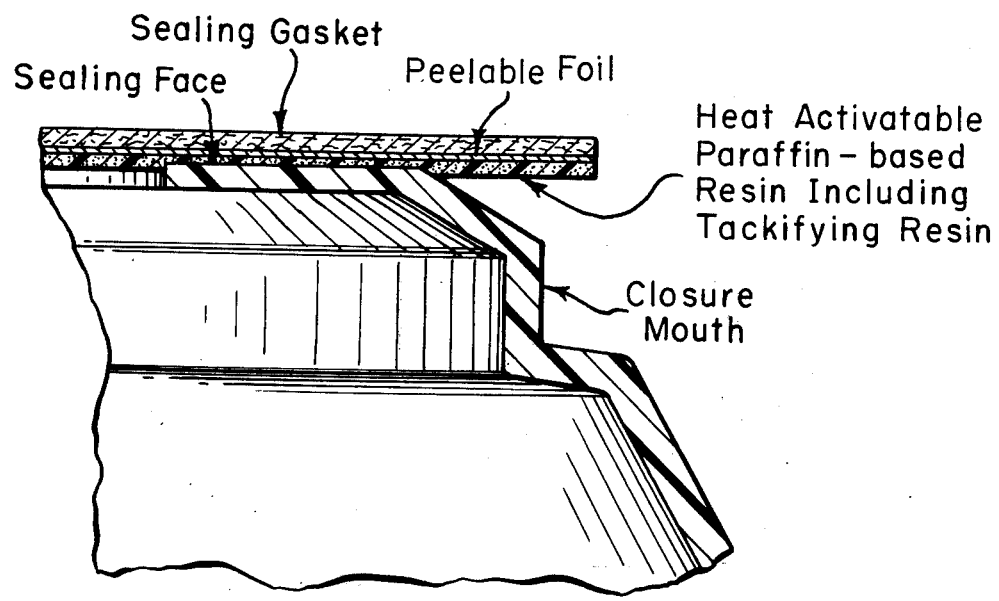

INDUCTION SEALED CLOSURE

INTRODUCTION

This invention relates to an improved seal whereby a sealing ply is effectively adhered to a closure mouth by inductive heating.

BACKGROUND OF THE INVENTION

Heretofore the prior art has developed sealing adhesive compositions which serve to provide a peelable water vapor transmission resistant sealing structure. Such sealing closures should be characterized by a ready removal of the sealing gasket on which the sealing ply may be located, said removal being expressed in terms of peelability. At the same time, however, it is important that the structure have the requisite seal-tight integrity that comes with a ply of sealing gasketing material.

Closures for containers which are formed by activating a sealing film while it is in place intermediate a cap and the sealing face of a closure mouth have been practiced and indeed disclosed in prior art such as U.S. Pat. No. 2,620,939 to Weisgerber, Dec. 9, 1952. The practice set forth in such art is to heat the cap and general vicinity of the container closure mouth and cause the heat to be transferred through the cap thereby activating the sealing film intermediate the face of the closure mouth and a diaphram temporarily mounted within the cap structure. More recent advances in the art have taught the use of induction heat sealing to cause a fusion between the sealing composition or resin located on the membrane and the sealing face of the closure mouth, to wit, U.S. Pat. No. 2,937,481 to Palmer, May 24, 1964, Method of Producing a Package. The Palmer Patent in essence achieves a fusion of the sealing composition per se with the sealing face of the closure. In effecting this fusion, however, there is remaining great difficulty in peelability and in essence there is a need for destruction of the membrane which is not always faithfully achieved, thus detracting from consumer acceptability of many consumer-oriented products.

STATEMENT OF THE INVENTION

The present sealing closure compensates for limitations in the peelability of such heat-activated sealing structures while at the same time providing a high order of seal-tight integrity and reliability with accompanying manufacturing economies as applied to sealing containers of organic thermoplastic materials. This invention is founded upon the discovery that, by employing a foil of, say, less than 5 mils coated with a heat activatable paraffin-based resin capable of being remelted after having been applied to the foil sealing membrane together with a suitable tackifying resin to be hereinafter illustrated, brief electrical induction heating confined to the foil can be advantageously employed under conditions which do not cause elevation of the sealing resin to above the point of decomposition and fusion with the sealing face of a closure mouth but do cause the resin to undergo an intended melting which together with an accompanying pressure cause caulking and redistribution of the sealing resin. The foil ply, closure and container will advantageously serve as a heat sink in the zone of induction heating to rapidly set the resin in place.

Details of the invention can be understood by reference to the accompanying FIGURE wherein the closure combination is depicted in sectional elevation.

Thus, in the case of an annular closure mouth on a bottle, say, of a low-density polyethylene the focusing of electromagnetic energy and the consequent induction heating of the foil per se in an area circumjacent the seal will cause the resin to be remelted, say, by heating to above 150°F and in the course of the sealing pressure, say, of a cap or other means operative to maintain the diaphram firmly and fixedly in place against the sealing face the resin will be caused to flow due to the sealing pressure and will be brought into most intimate and continuous contact with said sealing face. Collaterally, when the closure seal has been effected, it can be in turn perfected by termination of the induction sealing interval whereupon the heat of melting will be rapidly dissipated in both the closure, container body and the foil upon which the resin is applied. Thus, by employing aluminum foil, say, of the order of 0.5 to 3 mils preferably, induction heating of the foil occasions a focusing of heat on the surface of the sealing ply which is located intermediate the foil and the closure face. This localization of heat energy will be abbreviated and will not occasion overheating to achieve the desired remelting and thus avoids consequent decomposition of the materials which are used to form the sealing membrane. At the same time, the resin itself has sufficiently reduced tensile strength to provide the peelability advantages which are sought.

The paraffin-based wax composition serving as the sealing resin of this invention will generally have as its principal characterizing constituent a high melt point paraffin wax typically having a melting point above 140°F, a penetration (at 100%) from 13–19 and a viscosity (at 210°F) of from 40–46 seconds. This wax is prepared by methods known to those skilled in the art. The paraffin-based composition may have optionally included therein a microcrystalline wax for improved tackification but such is not essential. What is essential, however, is the employment of a normally solid co-polymer of ethylene and vinyl acetate generally. This preparation is known in the art as a resin and involves the co-polymerizing of a mixture of ethylene and vinyl acetate by means of a free radical producing catalyst such as oxygen or an organic peroxide. The arts of producing such a co-polymer are generally well known. The third essential characterizing ingredient employed in minor per cent is a supplement tackifying agent, preferably a co-polymer of vinyl toluene and alpha methyl styrene or other well-known tackifiers such as the light terpene resins used in the coating art.

By reason of the low viscosity of the low tensile strength paraffin-based composition of use in this invention, the material will activate and flow rapidly thus affording the ability to practice high speed sealing by induction heating. The energy inputs beneficially achieve a rapid activation of the sealant in the most efficient manner where functionality is desired. The sealing effected by activation of the ply in a pressurized face-to-face contact of the sealing gasket with the closure mouth is such that the wax provides a frangible matrix for the tackifying adhesive constituents described herein which matrix flows into a relatively microscopically uneven surface such as that generated on the exposed face of the flange of a sealing mouth on a closure composed of molded polyethylene or like container of suitable organic material such as vinylidene chloride, vinyl chloride-acetate polymer. By virtue of the rapid reduction in viscosity and the liquefacation of the sealing wax composition after activation under the focused abbreviated intense heating of electromagnetic energy in a foil of high electrical and heat conductivity, the sealing structure will be caulked through controlled flow of the total resin into the uneven surface of the closure mouth's sealing ply without fusing therewith.

The preferred ranges of hot melt paraffin-based resin composition components will be as follows:

| Ingredients | Weight % Range |
|---|---|
| Paraffin Wax (MP 143°–145°F) | 45–82.5% |
| Co-polymer of ethylene and vinyl acetate — Elvax 260 | 12.5–25% |
| Piccotex 120 * (resin co-polymer of vinyl toluene with alpha methyl styrene) | 5–25% |

*Supp. IV to 1963 Edition of Handbook of Material Trade Names by Zimmerman et al (Copyright 1965 by Industrial Research Service, Inc.)

The foregoing formulation range is that found to be the best practical mode for practicing the invention when the hot wax melts are applied to foil by a Gravure cylinder method. If it be desirable to apply an extrusion coating instead, the level of each minor element can be preferably increased within the foregoing range to the upper limit thereof but each such limit may be exceeded.

The foregoing wax resin composition as applied to the foil should have a tensile strength such that it will be operative to fail preferentially in a cleavage pattern at the coating per se in order to provide intended peelability. The following is a specific procedure that may be followed in testing the tensile strength of the preferred wax formulation of this invention and has been used successfully to provide replicable results. A foil sealing diaphram backed by paper to which it is laminated by glue or microcrystalline wax is subjected to a nitrocellulose wash to prime the foil face for wax application and serve to promote adhesion; then the paraffin-based formulation is applied by the Gravure cylinder method known in the art. The formulation will be applied at a thickness of, say, ½ to 3 mils, preferably 1 mil, and be cooled rapidly below the softening point and thereupon be allowed to return to ambient room temperature. This material will be subjected to the following test procedure: The laminated test specimen is heat sealed to a polyethylene test strip comparable to that of the sealing face of the closure mouth, the specimen is cut and locked in place intermediate the jaws of a tensile tester, the free exposed plies of the test specimen being fastened to and coplanar with the jaws by double-backed adhesive tape having an adhesion to the respective plies greater than the tensile strength of the test specimen per se; in this way, the tensile strength of the test specimen will be indicated by the rupture of the ply of the test specimen which is undergoing strains.

As the jaws of the tensile tester move apart, the unit tensile strength required to effect rupture of the ply undergoing tests will be observed much in the manner of a strain test. In formulating the membrane for use in this invention, the paper backing per se will not be relevant to the overall functionality of the sealing diaphram. The hot melt as applied as indicated above will generally have a tensile strength by test below 60 pounds per square inch, the numerical value being that measured when fatigue at the hot melt resin ply is first noticed at ASTM test condition of 73°F and 50% Rel. Humidity.

The low tensile strength will not vary significantly with the average molecular weight or density of the polyolefinic or like material to which it is sealed; the test strength of less than 60 pounds per square inch will be functionally operative for sealing with typical polyethylene abuttments having densities ranging from 0.91 to 0.965 and tensile strengths ranging from 600 to 5500, said latter tensile strengths being determined in accordance with ASTM procedure D-638 or D-651; cf. *Modern Plastics Encyclopedia*, Vol. 47, No. 10A, pub. 1970–71, ed. pg. 782.

The induction heat seal effected by activation of the paraffin-based hot melt will desirably be achieved on a high frequency induction sealer heating the foil in 0.1 to 0.5 seconds operating from an oscillating power source of 7.5 kw at a frequency of 350 kilocycles. The seal effected in accordance with this invention will also be a function of the pressure that is applied once the activated resin membrane is in place in abutting relation with the sealing face of the closure mouth, the term face being used herein to be synonomous with either a coating that is created on the surface of a flange or the flange per se which serves to provide the abutting sealing port for the total seal. Only a moderate pressure will be required. Generally speaking, the pressure should be sufficient to cause migration of the resin as activated to provide a more or less continuous contact between the resin at the zone of abuttment with the sealing face of the closure mouth.

The heat generated by resin-activation will be below the melting point of the sealing face which for all practical purposes may soften but will remain substantially unchanged and not be in a condition where it will fuse with the hot wax resin. On the other hand, the resin, under the positive pressure maintained during and after induction heating, will flow into the imperfections and to the extremities of the sealing membrane or flange and overflow same so as to provide a caulk for sealing the flange or membrane whereby the tackification coupled with the tensile strength of the resin itself when it cools provide the primary parameters for peelability of the membrane.

The foil ply will preferably be of a thickness less than 3 mils, a typical thickness being about 1 mil, foil selection criteria being dependant on electrical conductivity of the particular foil (which will preferably be aluminum) as well as the intended thermal conductivity to rapidly dissipate heat to set the resin after activation while it is in abutting contact. Generally the electromagnetic energy and current should be applied over such an abbreviated duration as to avoid over-heating the foil and the hot-melt; the specified thin foil avoids this over-heating, a feature which is most important to the present use of a paraffin-based wax coating. The electromagnetic field should not result in a melting of the foil disk but should elevate it to a temperature above 150°F for a long enough period to effect the requisite melting. Accordingly, the foil should not be so thin as to occasion an overloading of the foil with inductively-generated heat from the electro-magnetic field; further, the foil thickness should also be above that dimension whereat stray fields may be generated and cause eccentricities in the induction heating process; i.e. above 0.5 mils.

The induction-heating coil should be of a type which is adjacent to the sealing zone for effecting the hermetic seal so that the electromagnetic heating of the foil will occur in a zone proximate the closure face being sealed. Thus in the case of an annular neck of a bottle, the coil will be located circumjacent that neck, and, should the bottle be capped, circumjacent the cap per se, although other coil placements are practical.

For most applications where the closure mouth is in the form of an annular opening, the closure cap is of urea, polystyrene or polyethylene. It may be employed to house the sealing membrane which will be composed of a lamination of paper or pulp base wherein typically a 1 mil aluminum foil will be seated. In a preferred embodiment of the invention described in the co-pending application of Miller et al filed on or about Feb. 2, 1973 for "Container and Closure Therefor and Method of Manufacture Thereof," a closure structure is described wherein, as depicted in the drawing herein, the diaphram can be temporarily seated onto a bottle prior to activation of the hot melt for sealing in accordance with the invention. However, in lieu of that structure the diaphram may be temporarily seated by a layer of wax to the underside of a cap top and the cap screwed in place onto the closure mouth, the foil and heat-activated sealing resin on the diaphram being activated in accordance with the invention and the cap being removed by unscrewing and thereby rupturing the wax adhering the diaphram to the cap; in this case the wax is of a sufficiently low tensile strength to permit it to be broken away essentially as is described in *Modern Packaging Encyclopedia* 1966, pg. 372 - copyright McGraw Hill Inc. In lieu of a cap, where the container is to be of the single use type, the invention may be similarly practiced by providing a tab on the foil and diaphram to permit it to be readily peeled thus providing an equivalent mechanical method for a capless sealing operation.

Having thus described the best modes of practicing the invention, its primary advantage will be found to be that it produces a totally reliable hermetically sealed closure for a non-metallic container composed essentially of a synthetic organic thermoplastic composition like polyethylene. A bond is provided that is adhesive in nature as opposed to other induction sealed membranes that attain their sealability feature after a partial fusion of the coating to the sealing face of the closure mouth. The closure provides a peelable seal over a wide range of sealing conditions. It attains a seal at significantly lower temperatures than other coatings. Also, the induction heating time needed to produce the hermetic seal is significantly reduced thereby reducing any collateral problems that might stem from overexposure to heat of the container mouth, the sealant per se or the cap therefor.

The sealing membrane of foil coated with the paraffin-based resin may be produced in sheet form and then die cut in such a configuration that it will cover the surface to which it is to be adhered. The entire die cut structure may then be inserted in the inside of the closure cap or like means for holding the diaphram in place while maintaining the requisite pressure preparatory to and during the abbreviated induction heating. The dimensions of the sealing membrane and its location relative to the induction heating source are such that a relatively low frequency of 250–450 kilocycles can be advantageously employed to provide the requisite overall heating of the foil membrane with the moderate intensity required for localized activation of the wax ply in the vicinity of the sealing face of the closure mouth.

What is claimed is:

1. In an improved hermetically sealed package, an hermetic closure in combination comprising a closure mouth having a closure face, said face having a synthetic organic thermoplastic of a first melting point, and an abutting sealing membrane sealed to said closure face consisting essentially of an electrically conductive foil ply less than 5 mils thick having a frangible paraffin-based wax ply coated thereon, said wax ply having a melting point less than the first melting point and having been heated to above its own melting point but less than said first melting point while in abutting face-to-face pressure contact with said closure face and forming a continuous caulking seal with said face, said wax ply having been caused to flow in the region of abutment and being deformed to caulk the sealing face of the closure, said wax ply having a tackifying agent present in a minor weight percent thereof, the tensile strength of the wax ply being less than 60 psi and less than that of said synthetic organic thermoplastic material of said face whereby the ply is operative to fail in a cleavage pattern in the coating per se.

2. The package of claim 1 wherein the wax ply has an ethylene vinyl acetate co-polymer at a minor weight per cent.

3. The package of claim 1 wherein the closure face is a planar surface of a polymeric container.

4. The package of claim 3 wherein the closure mouth is a neck of a bottle having a flat planar surface at an annular upper extremity.

5. The package of claim 1 wherein the closure face is of polyethylene.

6. The package of claim 5 wherein the closure face is composed of an annular neck of a polyethylene bottle.

7. The package of claim 1 wherein the foil is between 0.5 and 3 mils thickness.

8. The package of claim 7 wherein the wax ply coating is 1.2 to 3 mils thick.

9. The package of claim 8 wherein the paraffin-based wax ply has both a tackifying agent and an ethylene vinyl acetate co-polymer each employed at a minor weight per cent of the wax ply.

* * * * *